United States Patent [19]

Chapin

[11] Patent Number: 5,390,114
[45] Date of Patent: Feb. 14, 1995

[54] ISOSTATICALLY CORRECTED GRAVITY DISPLAYS

[75] Inventor: David A. Chapin, Plano, Tex.

[73] Assignee: Atlantic Richfield Company, Los Angeles, Calif.

[21] Appl. No.: 165,607

[22] Filed: Dec. 13, 1993

[51] Int. Cl.$^6$ ............................................. G06F 15/68
[52] U.S. Cl. ................................. 364/420; 73/382 R
[58] Field of Search ................ 364/420, 421; 324/323; 73/382 R, 382 G

[56] References Cited

U.S. PATENT DOCUMENTS

| | | | |
|---|---|---|---|
| 4,068,160 | 1/1978 | Hunt | 364/420 |
| 4,636,955 | 1/1987 | Ginsburg | 364/420 |
| 5,282,132 | 1/1994 | Trout | 364/420 |

OTHER PUBLICATIONS

"Gravity and Magnetics in Oil Prospecting", L. L. Nettleton, copyright 1976 by McGraw Hill, pp. 15–21 and 278–283.

"A New Isostatic Residual Gravity Map of the Conterminous United States With A Discussion of the Significance of Isostatic Residual Anomalies" by Simpson, et al, The Journal of Geophysical Research, vol. 91, No. B8, pp. 8348–8372, Jul. 10, 1986.

"Airyroot: A Fortran Program for Calculating the Gravitational Attraction of an Airy Isostatic Root Out to 166.7 Km", United States Department of the Interior Geological Survey in Open–File Report 83–883, 1983.

"Random Fractal Forgeries", Richard F. Voss, NATO ASI Series, Vo. F17, Fundamental Algorithms for Computer Graphics, pp. 806–829.

"Gravity Anomalties and Flexure of the Lithosphere at Mountain Ranges", G. D. Karner, et al, Journal of Geophysical Research, vol. 88, No. B12, pp. 10,449–10,477, Dec. 10, 1983.

*Primary Examiner*—Donald E. McElheny, Jr.
*Attorney, Agent, or Firm*—Albert C. Metrailer

[57] ABSTRACT

A method for producing isostatically corrected gravity displays using available gravity data sets. The values of crustal density, density contrast between lower crust and mantle, and crustal thickness at sea level required for the Airy-Heiskanen equation are determined by analysis of the data set. Crustal density is determined by fractal analysis. Density contrast is determined by cross plotting Bouguer anomaly values versus elevation. Crustal thickness is determined by plotting power spectra of free-air gravity grids. The values are then used in the Airy-Heiskanen equation to provide the value of depth to crust-mantle boundary at each data point location in order to make accurate isostatic corrections and to produce accurate isostatically corrected displays.

6 Claims, 6 Drawing Sheets 5,390,114

ISOSTATICALLY CORRECTED GRAVITY DISPLAYS

BACKGROUND OF THE INVENTION

The present invention relates to improved gravity displays and more particularly, to improved methods for isostatically correcting gravity data to generate more accurate gravity grids, maps or other displays.

Displays of the earth's gravity field in the form of various grids or maps have long been considered useful in determining subsurface geology and structure. Such displays have been used in searching for all types of minerals, including oil and gas accumulations. The instruments and methods for acquiring original gravity data are well known. It is also well known that numerous corrections must be made to the raw gravity measurements in order to generate displays which are actually useful for the geological studies and exploration purposes.

Raw gravity measurements are normally corrected for variations of gravity with latitude, for variations of gravity with elevation, also known as the free-air effect, and for variations due to attraction of near surface material, also known as the Bouguer effect. Commercially available gravity data sets usually include these corrections. Typically such commercial data sets include four versions of the data: the raw gravity measurements; the raw data corrected for latitude; the raw data corrected for latitude and free-air effect; and the raw data corrected for latitude, free-air effect and Bouguer effect. See, for example, the text entitled "Gravity and Magnetics in Oil Prospecting" by L. L. Nettleton, copyright 1976 by McGraw Hill, Inc. As also discussed in this text, further refinements to gravity displays include corrections for isostasy, which allow the preparation of isostatically corrected gravity displays. Generally stated, isostasy relates to variations in gravity readings caused by a deficiency in density under areas of high topography.

The isostatic correction is quite important for oil prospecting. Generally stated, surface features of high elevations, such as mountains, exhibit low gravity readings. Unfortunately, subsurface basins which indicate the possible presence of hydrocarbons, also produce low gravity anomalies. As a result, high elevations can easily mask the presence of the subsurface features which may be desirable from the point of view of the oil explorationist. The isostatic correction, if performed properly, can correct for the gravity lows produced by the surface features. If this is done accurately, any resulting low gravity features can indicate the presence of basins which are suitable for the accumulation of hydrocarbons. Thus, from the point of view of the oil explorationist, it is quite important that the isostatic corrections be made and that they made accurately.

Generally speaking, the basic methods for preparing isostatically corrected gravity maps are well known. See, for example, the publication "A New Isostatic Residual Gravity Map of the Conterminous United States With A Discussion of the Significance of Isostatic Residual Anomalies" by Simpson, et al., published in The Journal of Geophysical Research, Volume 91, No. B8, pages 8348-8372, Jul. 10, 1986. Simpson, et al. have also provided computer software useful in preparation of such maps which has been published in "Airyroot: A Fortran Program for Calculating the Gravitational Attraction of an Airy Isostatic Root Out to 166.7 Km" published by the United States Department of the Interior Geological Survey in Open-File Report 83-883, 1983. However, as discussed by Simpson, et al., the basic equation for the isostatic correction requires the use of three quantities: the crustal density, $\rho$; the density contrast between lower crust and mantle, $\Delta\rho$; and the crustal thickness at sea level, T. In all prior isostatically corrected maps, these three quantities have been assigned assumed values generally based on prior publications. That is, they are not actually based on measured values. Since the accuracy of the isostatic corrections is clearly dependent upon the accuracy of these three values, the accuracy of the resultant isostatically corrected maps is subject to question.

SUMMARY OF THE PRESENT INVENTION

According to the present invention, reliable isostatically corrected displays are generated using values of $\rho$, $\Delta\rho$, and T, which are determined from actual data using three separate methods. Crustal density is determined by fractal analysis. Density contrast is determined by cross plotting Bouguer anomaly values versus elevation. Crustal thickness is determined by plotting power spectra of free-air gravity grids. The resulting isostatically corrected maps can be used with confidence that the isostatic correction has been properly made.

BRIEF DESCRIPTION OF THE DRAWINGS

The present invention may be better understood by reading the following description of the preferred embodiments with reference to the accompanying drawings wherein.

DESCRIPTION OF THE PREFERRED EMBODIMENTS

Figure 1:
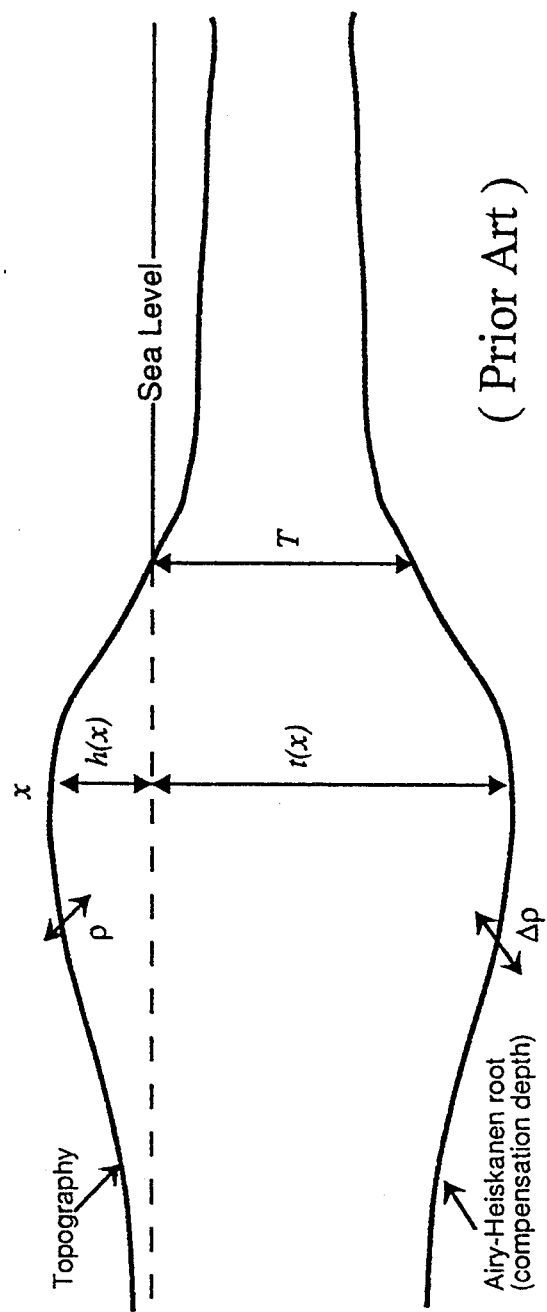
FIG. 1 is an illustration of the Airy-Heiskanen model.

In making isostatic corrections to gravity data, there are several different approaches based on various well known models of subsurface earth structure. In the present invention, the Airy-Heiskanen model, illustrated in FIG. 1, is used. The corresponding Airy-Heiskanen equation is as follows:

$$t(x) = h(x)\frac{\rho}{\Delta\rho} + T$$

In making the isostatic correction which is needed, t(x), is the depth to the crust-mantle boundary at location x at which a particular gravity reading has been taken. As illustrated in FIG. 1, the elevation of the location x, h(x), is measured at the time the gravity reading is taken and is thus a known quantity. The crustal density at the atmosphere-crust interface, $\rho$, is generally unknown. Likewise, the density contrast between lower crust and mantle, $\Delta\rho$, is also generally unknown. The crustal thickness at sea level, T, is also unknown. In prior isostatic correction efforts, all three of these quantities have been assigned various assumed values. In the present invention these values are determined based on the actual data.

Figure 2:
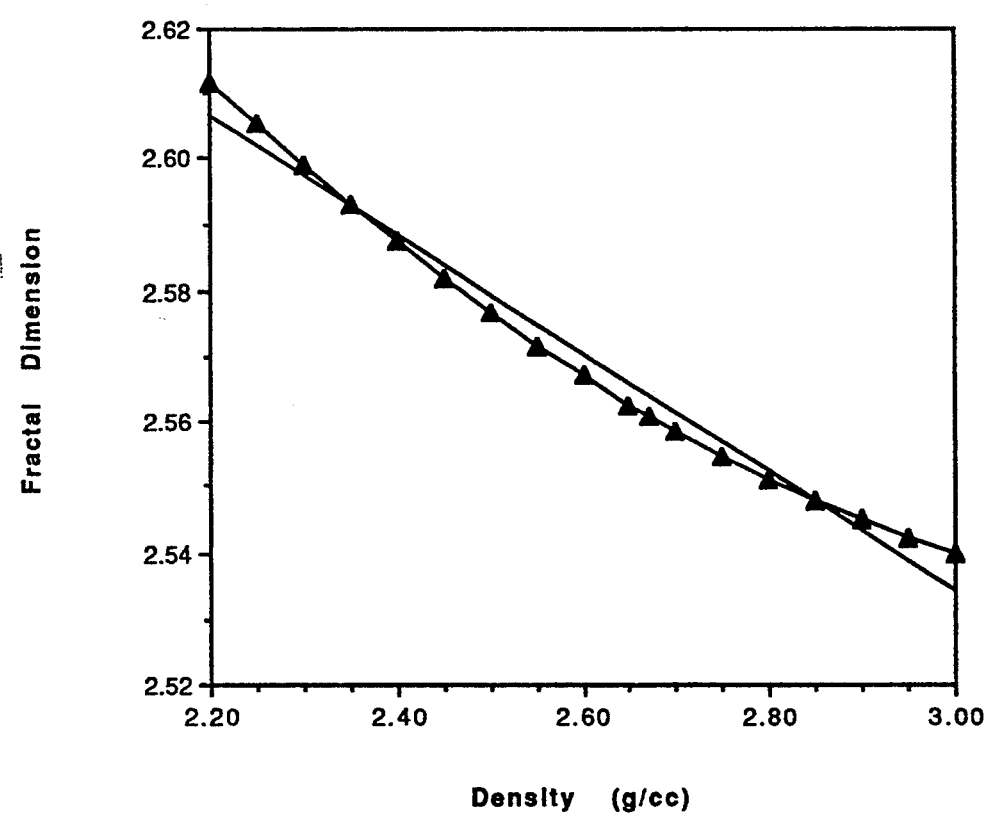
FIG. 2 is a plot of fractal dimension of gravity data versus density used to determine crustal density.
Figure 3:
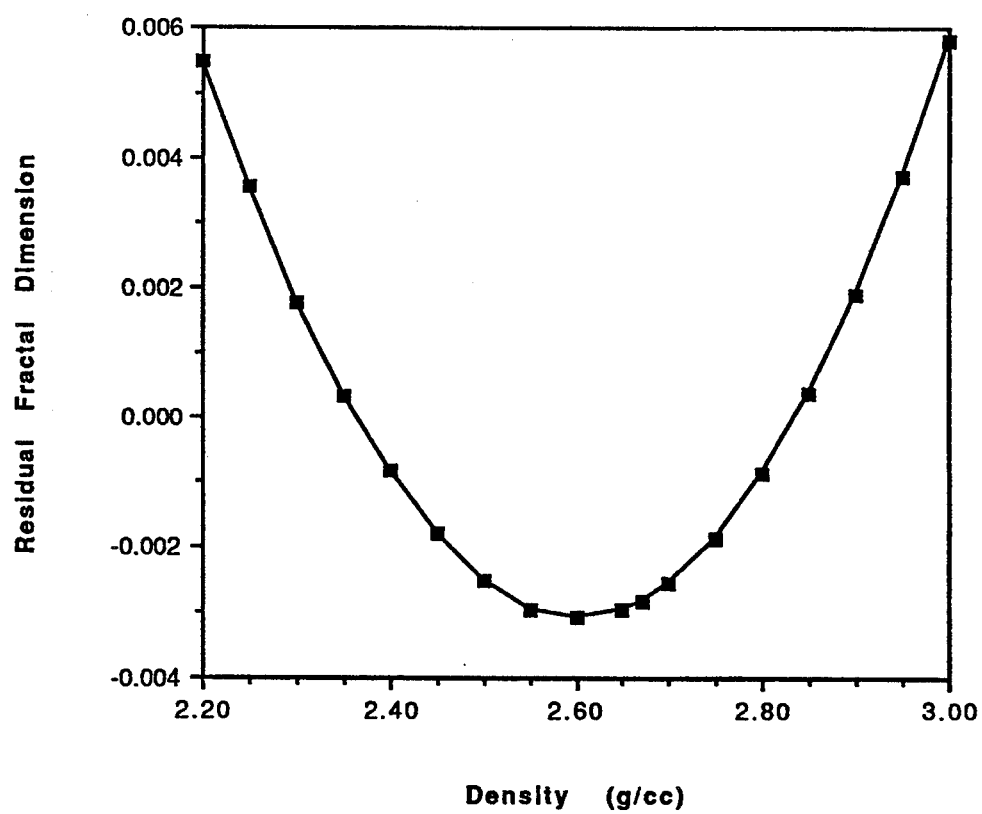
FIG. 3 is a plot of the data of FIG. 2 in which the general trend has been removed to graphically identify the minimum point.

With reference to FIGS. 2 and 3, the method for determination of the actual value of crustal density $\rho$ is illustrated. These plots were generated using actual gravity data from South America. This data set had been corrected for latitude, free-air, and Bouguer effect. The data set was then analyzed to determine its fractal dimension over a range of assumed values of crustal density $\rho$. Prior publications indicate an almost universal assumption that crustal density is 2.67 grams per cubic centimeters, or that this value is sufficiently close for use at any location on the earth. The present analysis was therefore performed at a range of densities generally centered on this previously assumed value. There are several different methods for computing fractal dimensions of data sets. FIGS. 2 and 3 were generated by use of the spectral analysis technique of computing fractal dimension. See, for example, the publication "Random Fractal Forgeries" by Richard F. Voss published in the NATO ASI Series, Volume F17, Fundamental Algorithms for Computer Graphics.

By use of fractal analysis, the topographic contribution to the gravity data is actually measured so that the density which minimizes topographic effects can be numerically determined. The gravity data is a mixed phenomenon, including the combination of scale dependent and scale independent (that is fractal) components. Topography is primarily a scale independent, fractal, component, while gravity effects of specific geological distributions of density are primarily scale dependent. In particular, the gravity anomaly from the lower crust mantle interface in the Airy-Heiskanen model must be scale dependent because it is based upon Euclidean geometry. Therefore, fractal analysis provides a quantitative mechanism for separating isostatic effects from topographic effects within the gravity data.

In FIG. 2, the fractal dimension has been plotted versus density. In addition, there is illustrated a straight line indicating the average trend of the plotted data. FIG. 3 is a plot of the same data from which the average trend has been removed. This allows the graphical identification of the point of minimum fractal dimension in relation to assumed density values. As is apparent from this curve, the proper crustal density value for South America is 2.60 grams per cubic centimeter.

Figure 4:
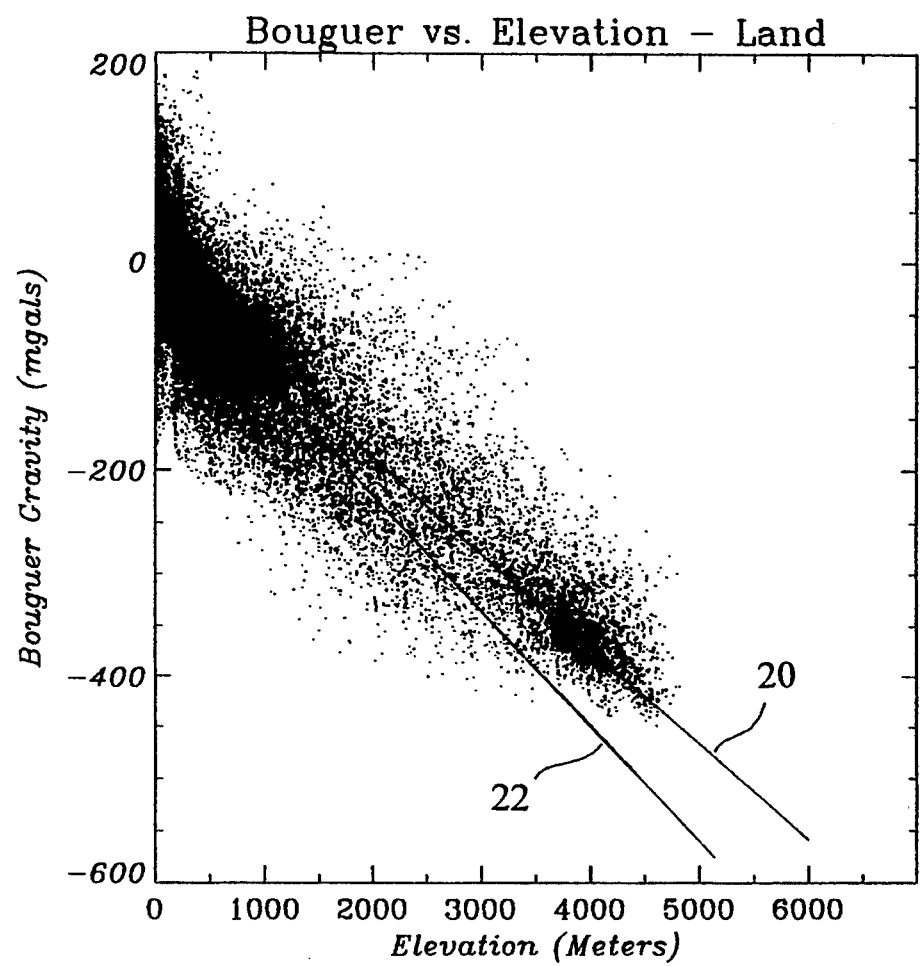
FIG. 4 is a cross plot of Bouguer anomaly values used to determine density contrast.

With reference to FIG. 4, the method for determining the density contrast between lower crust and mantle, $\Delta\rho$, will be described. In FIG. 4, all of the data points from the South American gravity set, which have been corrected for latitude, free-air and Bouguer effect, are plotted versus elevation. Also illustrated is a general trend line 20 for the actual plotted data. A second trend line 22 which corresponds to a predicted Bouguer value is also plotted. It is the difference between these two lines which provides the actual value of $\Delta\rho$.

Cross plotting of elevation versus Bouguer anomaly has been a standard procedure for previous investigators of isostasy. For continental scale data sets, these plots show a decrease in Bouguer gravity with increased elevation. This can be predicted by the Bouguer correction formula:

$$BC = h(x) * A\rho$$

where:

BC is the Bouguer correction;
A is the constant 0.04193 for units in meters; and
$h(x)$ is the elevation at location x.

Since the Bouguer correction is subtracted from free-air gravity, the result is a more negative Bouguer gravity anomaly. However, when previous workers have attempted to compare the observed elevation versus Bouguer trend, it does not fall on the trend predicted by the Bouguer correction formula. In all cases, the resulting observed trend is equivalent to Bouguer correction formula using a lower density than predicted. I have discovered that this is because the Bouguer anomaly, BA, contains the density contrast across the crust-atmosphere interface, $\rho$, as well as the density contrast across the crust-mantle interface, $\Delta\rho$, in the following relationship:

$$BA \alpha \rho + \Delta\rho$$

The gravity effect of both $\rho$ and $\Delta\rho$ are elevation dependent in the Airy-Heiskanen model. Therefore it follows that in a gross statistical sense for a continental scale data set, one can derive the density contrast, $\Delta\rho$, of the mantle crust interface according to the following formula:

$$\Delta\rho = \rho(observed) - \rho(predicted)$$

where $\rho$ (observed) is the observed density trend and $\rho$ (predicted) is the Bouguer corrected density. Note that the correct Bouguer correction density, determined using fractal analysis for instance, is not required, it is only the difference that is important. If the Bouguer correction density is not correct, this error will equally effect both terms by the same amount.

Thus, with reference to the graphical analysis shown in FIG. 4, the observed density corresponds to trend line 20 while the predicted density corresponds to trend line 22. The difference, therefore, is the appropriate $\Delta\rho$ at the crust-mantle interface. For the South American data set the value of $\Delta\rho$ is 0.45 grams per cubic centimeter.

Figure 5:
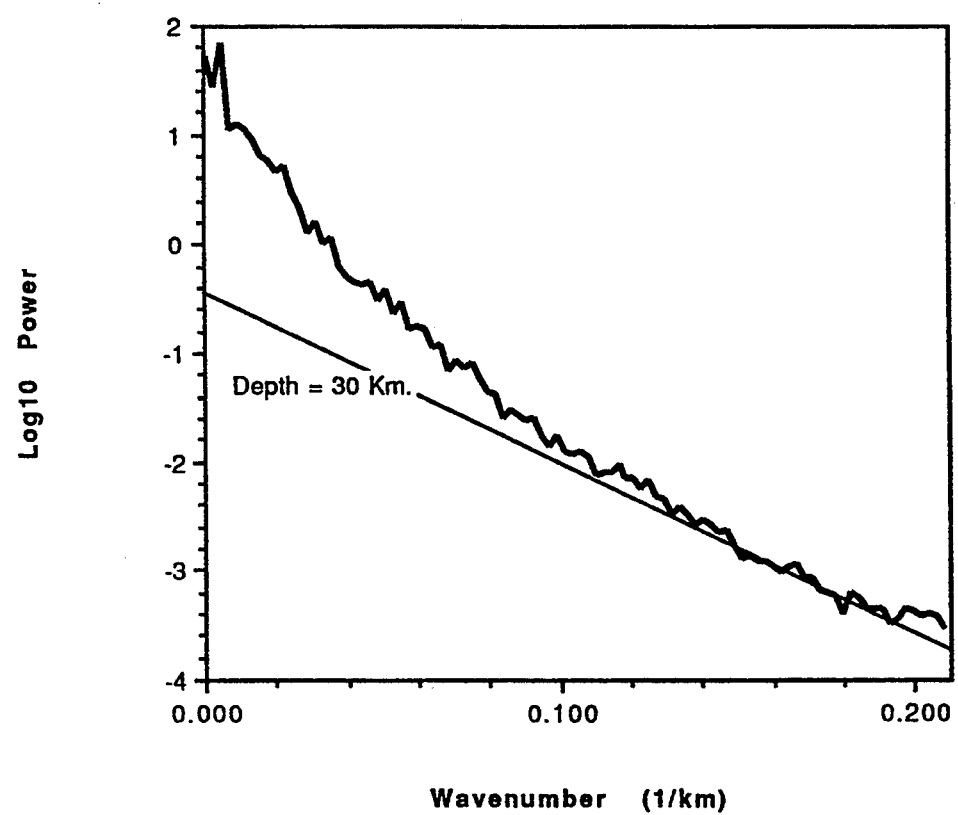
FIG. 5 is plot of the power spectra of free-air gravity used to determine crustal thickness.

With reference now to FIG. 5, it illustrated the method for determination of the crustal thickness at sea level, T. In creating FIG. 5, the data set corrected only for latitude and free-air effect was used to create a uniform grid as is well known in the art. As used herein the term "free-air gravity" means data corrected for both latitude and free-air effect. The free-air gravity grid was then used to generate the power spectrum of free-air gravity data. Creation of power spectrum plots is well known in the art, see for example the publication entitled "Gravity Anomalies and Flexure of the Lithospere at Mountain Ranges", G. D. Karner, et al, Journal of Geophysical Research, Vol. 88, No. B12, Pages 10,449–10,477, Dec. 10, 1983. As shown by previous researchers, such power spectra include several essentially straight line sections, each of which corresponds to a given depth. As illustrated in FIG. 5, one of these straight line sections corresponds to a depth of 30 kilometers. This depth value is determined by taking the slope of the power spectrum and multiplying by minus 2. Other straight line sections of the power spectrum correspond to the deeper interfaces, the effects of which are insignificant for isostatic correction. Therefore, for the South American data set, the correct value of crustal thickness at sea level, T, is 30 kilometers.

Figure 6:
FIG. 6 is a display of isostatically corrected gravity data in the form an isogal map of South America.

After determination of the values of $\rho$, $\Delta\rho$, and T according to the methods illustrated above, isostatically corrected displays can be generated using known techniques. FIG. 6 is an illustration of an isogal map of South America generated using the values determined as illustrated above. The values of t(x) were used as inputs to the Airyroot program provided by the United States Department of Interior Geological Survey to generate the isogal map of FIG. 6. As is well known in the art, other displays of the gravity values can also be generated. For example, color maps wherein each color illustrates a range of gravity values are commonly used. Alternatively other displays based on the gravity data can be improved or created based on the present invention. For example, maps or other displays of crustal density, $\rho$, determined by the fractal analysis technique would be useful for various exploration purposes.

While the present invention has been illustrated and described in terms of particular methods of preparing isostatically corrected gravity displays, it is apparent that various modifications can be made therein within the scope of the appended claims.

What is claimed is:

1. A method for producing isostatically corrected gravity displays using gravity measurements which have been corrected for latitude, free-air and Bouguer effects, comprising:

using said corrected data to determine the crustal density, $\rho$, at the atmosphere-crust interface by using fractal analysis of said data to determine the density which minimizes the topographic effect in the Bouguer correction;

using said data to determine the density contrast, $\Delta\rho$, between lower crust and mantle by cross plotting elevation versus Bouguer anomaly;

using said data to determine the crustal thickness, T, at sea level by using said data to create power spectra using grids of free-air gravity data and determining T from the slopes of the spectra;

using the values of $\rho$, $\Delta\rho$ and T so determined and the known elevation, h(x), at each location, x, of each gravity measurement to determine the depth to crust-mantle boundary at location x, t(x), according to the formula $$t(x) = h(x)(\rho/\Delta\rho) + T;$$

using said values of t(x) to isostatically correct the gravity values and using said isostatically corrected values to generate an isostatically corrected gravity display.

2. The method of claim 1, wherein:

crustal density, $\rho$, is determined by calculating fractal dimension of the corrected data for a plurality of assumed density values, determining the average trend of such calculated values, subtracting the average trend from the calculated values, plotting the resulting fractal dimension values versus density, and selecting the density corresponding to minimum point on the plot as the true crustal density, $\rho$.

3. The method of claim 1, wherein:

the density contrast, $\Delta\rho$, is determined by cross plotting the Bouguer anomaly values versus elevation, determining the average trend of such plotted values, calculating the trend predicted by the Bouguer correction formula, determining the density difference between densities indicated by the two trends, and selecting the density difference as the density contrast, $\Delta\rho$.

4. The method of claim 1, wherein:

the crustal thickness, T, is determined by plotting a uniform grid of gravity values derived from the gravity data corrected only for free air effect, creating a power spectrum of the grid values, identifying a straight line section of said spectrum, determining the slope of said straight line section, multiplying said slope by minus 2, and selecting the resulting value as the crustal thickness, T.

5. A method for producing isostatically corrected gravity displays using gravity measurements which have been corrected for latitude, free-air and Bouguer effects, comprising:

using said corrected data to determine the crustal density, $\rho$, at the atmosphere-crust interface by using fractal analysis of said data to determine the density which minimizes the topographic effect in the Bouguer correction;

using the value of $\rho$ determined by fractal analysis, assumed values of $\Delta\rho$ and T, and the known elevation, h(x), at each location, x, of each gravity measurement to determine the depth to crust-mantle boundary at location x, t(x), according to the formula $$t(x) = h(x)(\rho/\Delta\rho) + T;$$

using said values of t(x) to isostatically correct the gravity values; and using said isostatically corrected values to generate an isostatically corrected gravity display.

6. The method of claim 5, wherein:

crustal density, $\rho$, is determined by calculating fractal dimension of the corrected data for a plurality of assumed density values, determining the average trend of such calculated values, subtracting the average trend from the calculated values, plotting the resulting fractal dimension values versus density, and selecting the density corresponding to minimum point on the plot as the true crustal density, $\rho$.

* * * * *